United States Patent
Jang

(10) Patent No.: US 10,788,828 B2
(45) Date of Patent: Sep. 29, 2020

(54) METHOD AND APPARATUS FOR OPERATING AUTONOMOUS DRIVING CONTROLLER OF VEHICLE

(71) Applicant: Samsung Electronics Co., Ltd., Suwon-si (KR)

(72) Inventor: Cheolhun Jang, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 15/623,923

(22) Filed: Jun. 15, 2017

(65) Prior Publication Data

US 2018/0059664 A1 Mar. 1, 2018

(30) Foreign Application Priority Data

Sep. 1, 2016 (KR) .................. 10-2016-0112485

(51) Int. Cl.
   *G05D 1/00* (2006.01)
   *B60W 30/00* (2006.01)
   *G05D 1/02* (2020.01)

(52) U.S. Cl.
   CPC .......... *G05D 1/0088* (2013.01); *B60W 30/00* (2013.01); *G05D 1/0061* (2013.01); *G05D 1/0214* (2013.01); *G05D 1/0246* (2013.01); *G05D 1/0257* (2013.01); *G05D 1/0285* (2013.01); *G05D 2201/0213* (2013.01)

(58) Field of Classification Search
   None
   See application file for complete search history.

(56) References Cited

U.S. PATENT DOCUMENTS

| | | | |
|---|---|---|---|
| 2008/0272957 A1 | 11/2008 | Schoeberl | |
| 2009/0079839 A1* | 3/2009 | Fischer | G01S 7/003 348/218.1 |
| 2013/0289824 A1* | 10/2013 | Mudalige | G08G 1/167 701/41 |
| 2015/0025708 A1 | 1/2015 | Anderson | |
| 2015/0073661 A1 | 3/2015 | Raisch et al. | |
| 2015/0336576 A1* | 11/2015 | Sung | B60W 30/09 701/26 |
| 2015/0367848 A1 | 12/2015 | Terashima | |
| 2016/0176397 A1* | 6/2016 | Prokhorov | B60W 30/09 701/25 |
| 2017/0090480 A1* | 3/2017 | Ho | G05D 1/0214 |
| 2017/0371336 A1* | 12/2017 | Mei | G05D 1/0212 |

FOREIGN PATENT DOCUMENTS

JP 2008-0225583 A 9/2008

OTHER PUBLICATIONS

Lipson et al., "Driverless: Intelligent Cars and the Road Ahead", 2016, MIT Press, p. 46-47 and 189 (Year: 2016).*

* cited by examiner

*Primary Examiner* — Tamara L Weber
(74) *Attorney, Agent, or Firm* — Sughrue Mion, PLLC

(57) ABSTRACT

Provided is a method and apparatus for operating an autonomous driving controller, the method including generating route information for the vehicle based on a rule, transitioning from an autonomous driving mode to an autonomous driving disable mode, in response to the driving route information not being generated for an amount of time greater than or equal to a threshold, tracking at least one neighboring vehicle based on data sensed by a sensor, and generating temporary driving route information based on a movement of the at least one neighboring vehicle.

20 Claims, 14 Drawing Sheets

Vehicle moving direction

Vehicle moving direction

Vehicle moving direction

Vehicle moving direction

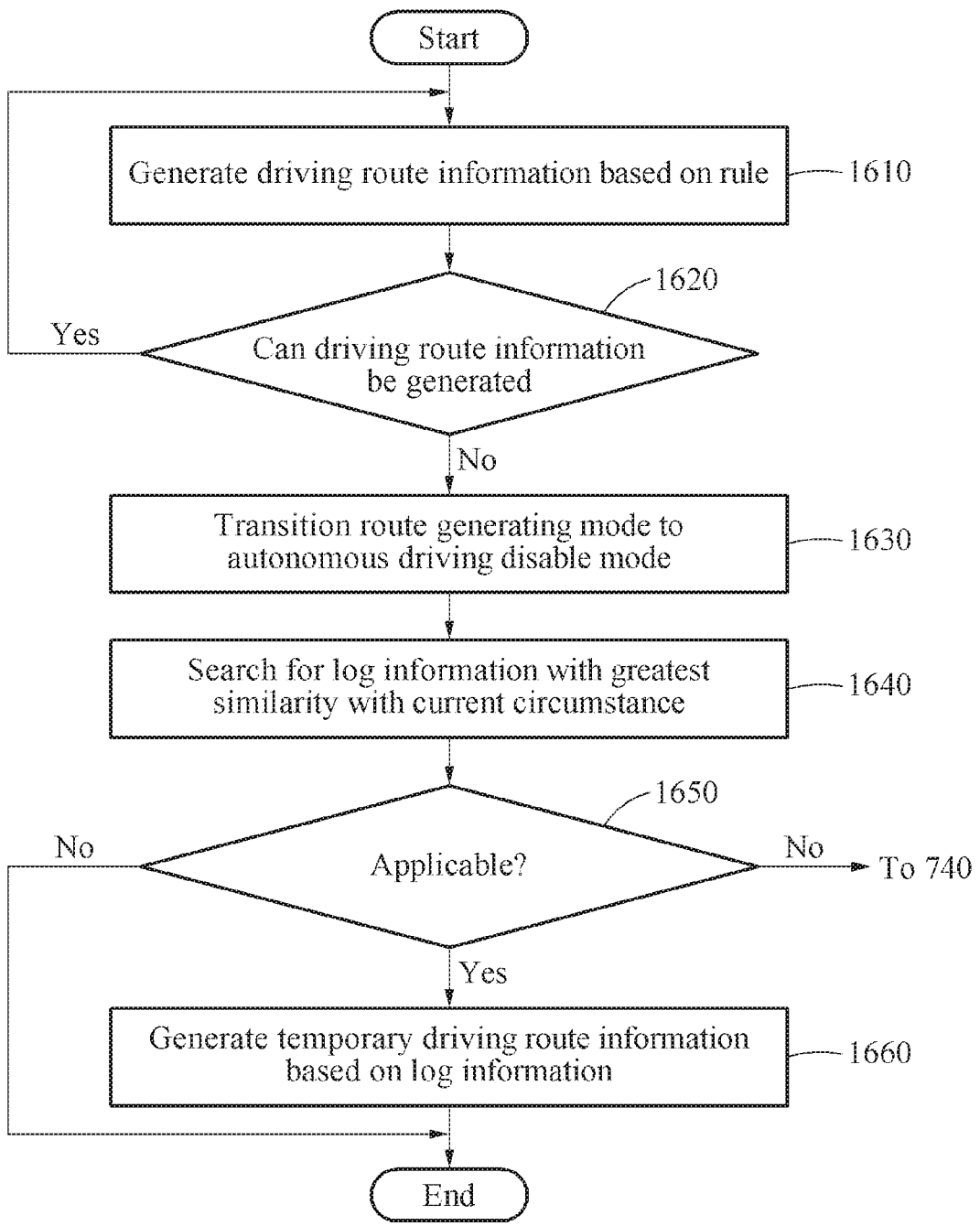

METHOD AND APPARATUS FOR OPERATING AUTONOMOUS DRIVING CONTROLLER OF VEHICLE

CROSS-REFERENCE TO RELATED APPLICATION(S)

This application claims the benefit under 35 USC § 119(a) of Korean Patent Application No. 10-2016-0112485 filed on Sep. 1, 2016, in the Korean Intellectual Property Office, the entire disclosure of which is incorporated herein by reference for all purposes.

BACKGROUND

1. Field

The following description relates to a method and apparatus for operating an autonomous driving controller, such as, generating a temporary driving route in response to a driving route being impossible to generate based on a rule.

2. Description of Related Art

A method of generating a driving route based on a rule includes recognizing surrounding objects and generating a driving route that meets traffic regulations and avoids contact with the surrounding objects. However, generating a driving route that meets traffic regulations may not be possible in an actual driving circumstance. A process for performing the method of generating the driving route based on the rule may be suspended until an obstacle is eliminated. In such circumstance, the method of generating the driving route based on the rule may be insufficient to enable autonomous driving.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of driving a vehicle, the method including generating route information for the vehicle based on a rule, transitioning from an autonomous driving mode to an autonomous driving disable mode, in response to the driving route information not being generated for an amount of time greater than or equal to a threshold, tracking at least one neighboring vehicle based on data sensed by a sensor, and generating temporary driving route information based on a movement of the at least one neighboring vehicle.

The generating of the driving route information may include recognizing a surrounding environment of the vehicle based on the data sensed by the sensor, and generating the driving route information based on the recognized surrounding environment and the rule.

The tracking of the movement of the at least one neighboring vehicle may include periodically determining a location of the at least one neighboring vehicle, and tracking the movement of the at least one neighboring vehicle based on a change of the location of the at least one neighboring vehicle.

The generating of the temporary driving route information may include determining a difference in movement between a first neighboring vehicle and a second neighboring vehicle, in response to movements of two neighboring vehicles being tracked, and generating the temporary driving route information based on the difference in movement between the first neighboring vehicle and the second neighboring vehicle.

The determining of the difference may include determining the difference by comparing a first surrounding environment in which the first neighboring vehicle moves to a second surrounding environment in which the second neighboring vehicle does not move, and the generating of the temporary driving route information comprises generating the temporary driving route information based on the first surrounding environment including the difference.

The generating of the temporary driving route information may include generating the temporary driving route information to move the vehicle based on a change of a location of the at least one neighboring vehicle.

The at least one neighboring vehicle may include a vehicle moving in a direction identical to a direction of the vehicle.

The at least one sensor may include any one or any combination of a camera, a lidar, and a radar.

The generating of the temporary driving route information may include generating the temporary driving route information in response to an absence of a movement of a vehicle in a direction different from a direction of the vehicle.

The method may include updating, in a memory, log information, in response to the driving route information not being generated.

The method may include searching the memory for the log information corresponding to a current circumstance, in response to the route generating mode being transitioned to the autonomous driving disable mode, and generating the temporary driving route information based on the log information corresponding to the current circumstance.

The current circumstance may include any one or any combination of a type of an obstacle, a size of the obstacle, weather conditions, type of a road, road conditions, a size of a lane, and a number of lanes, and the searching may include searching the memory for the log information having greatest similarity with the current circumstance.

The method may include receiving the temporary driving route information through wireless communication or vehicle to vehicle (V2V) communication with the at least one neighboring vehicle, in response to the route generating mode being transitioned to the autonomous driving disable mode.

In another general aspect, there is provided an autonomous driving controller including a memory configured to store instructions, and a processor configured to execute the instructions to generate route information for a vehicle based on a rule, transition from an autonomous driving mode to an autonomous driving disable mode, in response to the driving route information not being generated for an amount of time greater than or equal to a threshold, track at least one neighboring vehicle based on data sensed by a sensor, and generate temporary driving route information based on a movement of the at least one neighboring vehicle.

In one general aspect, there is provided a method of controlling autonomous driving controller, the method including generating route information for a vehicle based on a rule, transitioning from an autonomous driving mode to an autonomous driving disable mode, in response to the driving route information not being generated for an amount of time greater than or equal to a preset time, searching a memory for log information having greatest similarity with a current circumstance, in response to the transitioning to the autonomous driving disable mode, and generating temporary driving route information based on the log information.

In one general aspect, there is provided a method of driving a vehicle, the method including generating route information for the vehicle being driven in an autonomous driving mode, disabling the autonomous driving mode, in response to the route information violating a rule for a time period greater than a threshold, tracking a change of location of at least one neighboring vehicle based on data sensed by a sensor, and generating temporary driving route information based on the change of the location of the at least one neighboring vehicle.

The generating of the temporary driving route may include generating the temporary driving route based on the change of the location of the at least one neighboring vehicle and a surrounding environment in which the at least one neighboring vehicle moves.

The method may include updating log data, in a memory, in response to the generating of the temporary driving route.

The generating of the temporary driving route may include generating the temporary driving route based on the change of the location of the at least one neighboring vehicle and log entry, stored in the memory, corresponding to a surrounding environment of the vehicle.

Other features and aspects will be apparent from the following detailed description, the drawings, and the claims.

BRIEF DESCRIPTION OF THE DRAWINGS

FIG. 16 is a diagram illustrating an example of a method of generating temporary driving route information.

Figure 1:
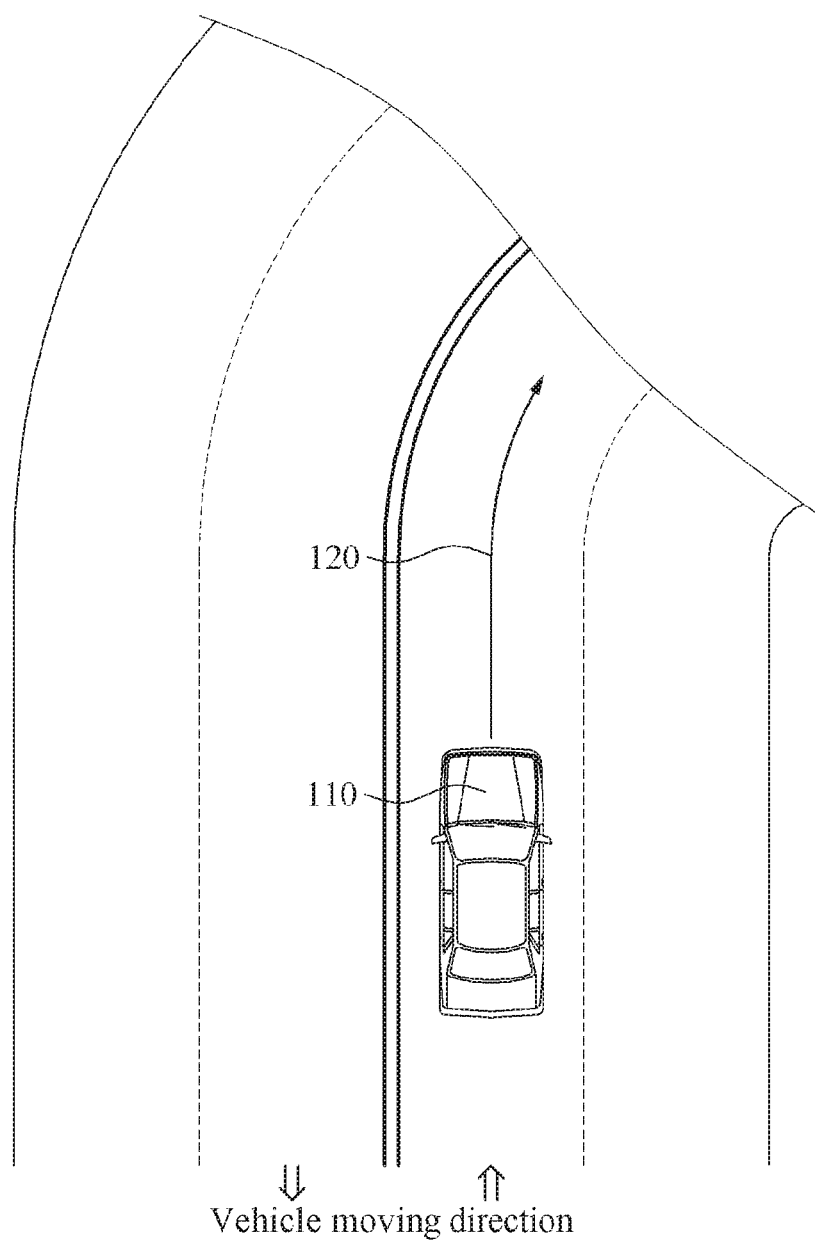
FIG. 1 illustrates an example of an autonomous vehicle.
Figure 2:
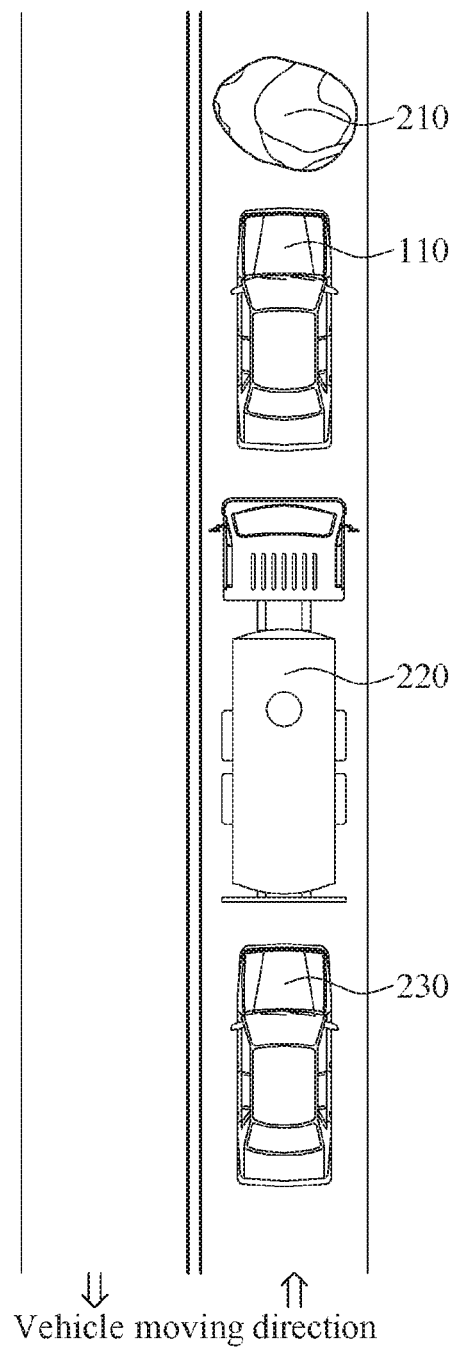
FIGS. 2 through 5 each illustrate an example of a method of generating temporary driving route information.
Figure 3:
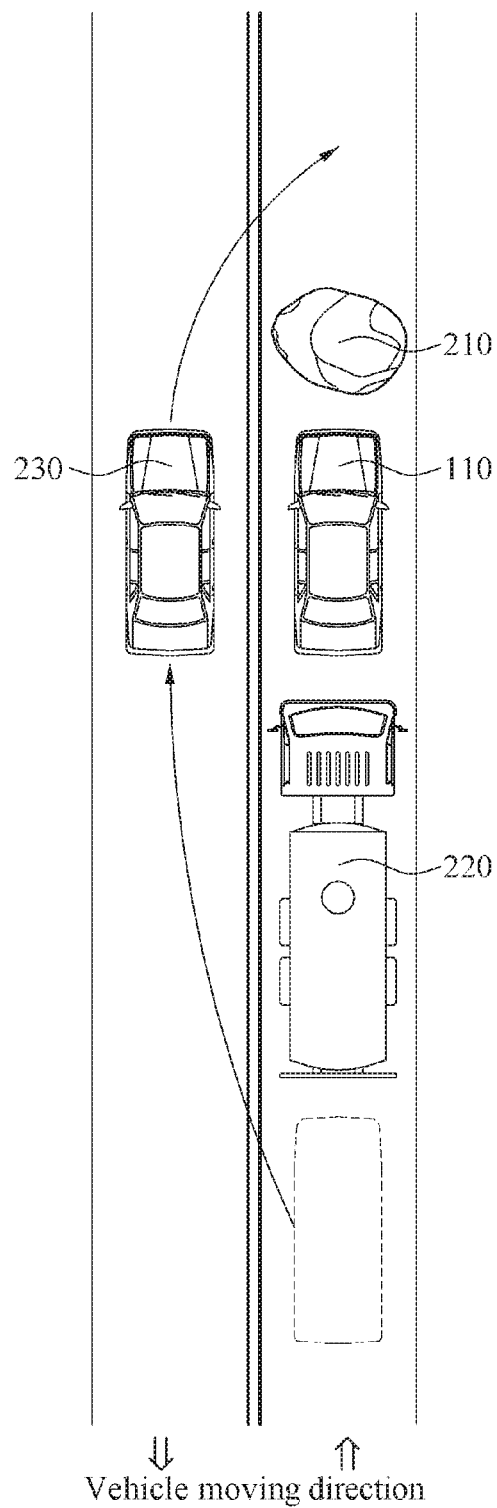

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art after having a full understanding of the present disclosure. The sequences of operations described herein are merely examples, and are not limited to those set forth herein, but may be changed as will be apparent to one of ordinary skill in the art, with the exception of operations necessarily occurring in a certain order, after a full understanding of the present disclosure. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or apparatuses described herein that will be apparent after an understanding of the disclosure of this application.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

FIG. 1 illustrates an example of an autonomous vehicle. An autonomous vehicle, hereinafter also referred to as a vehicle 110, may be driven in an autonomous mode in response to a recognized driving environment, even in a circumstance in which there is little user input, or no user input by a driver. The driving environment is recognized through at least one sensor attached to or included in a vehicle, such as, for example, a camera, a lidar, a radar, and voice recognizing sensors. Other types of sensors are considered to be well within the scope of the present disclosure. The driving environment includes a type of a road, a type of a lane, a distance from a neighboring vehicle, whether a neighboring vehicle is present, whether an obstacle is present, and weather, but the driving environment is not limited thereto.

The vehicle 110 recognizes the driving environment and generates a driving route 120 that is appropriate for the driving environment. The vehicle 110 controls mechanical elements of the vehicle 110 in order to follow the driving route 120. The vehicle 110 periodically generates and updates the driving route 120. The vehicle 110 generates the driving route 120 using a rule-based model. For example, conditions to be followed by the vehicle 110 may be set in advance, and the vehicle 110 may generate the optimal driving route 120 that satisfies the preset conditions. For example, one of the conditions may be to observe traffic regulations.

In an example, the driving route 120 generated using the rule-based model is not generated under some circumstances. For example, the driving route 120 is not generated when the driving route 120 cannot meet the traffic regulations. When the driving route 120 is not generated, the vehicle 110 may not be autonomously driven further and may stand by until the driving route 120 is generated. Further description of generating a temporary driving route when the driving route 120 is not generated using the rule-based model is provided with reference to FIGS. 2 through 16.

FIGS. 2 through 5 each illustrate an example of a method of generating temporary driving route information.

When an obstacle 210 is present in a driving lane, the vehicle 110 generates a driving route that allows vehicle 110 to detour around the obstacle 210. When no driving route is available, which allows the vehicle 110 to detour around the obstacle 210, the vehicle 110 may stand still. When the standby time exceeds a threshold amount of time, the vehicle 110 generates a temporary driving route without using a rule-based model. In an example, the vehicle 110 generates the temporary driving route by imitating movements of neighboring vehicles 220 and 230 moving in a direction identical to a direction of the vehicle 110.

Figure 4:
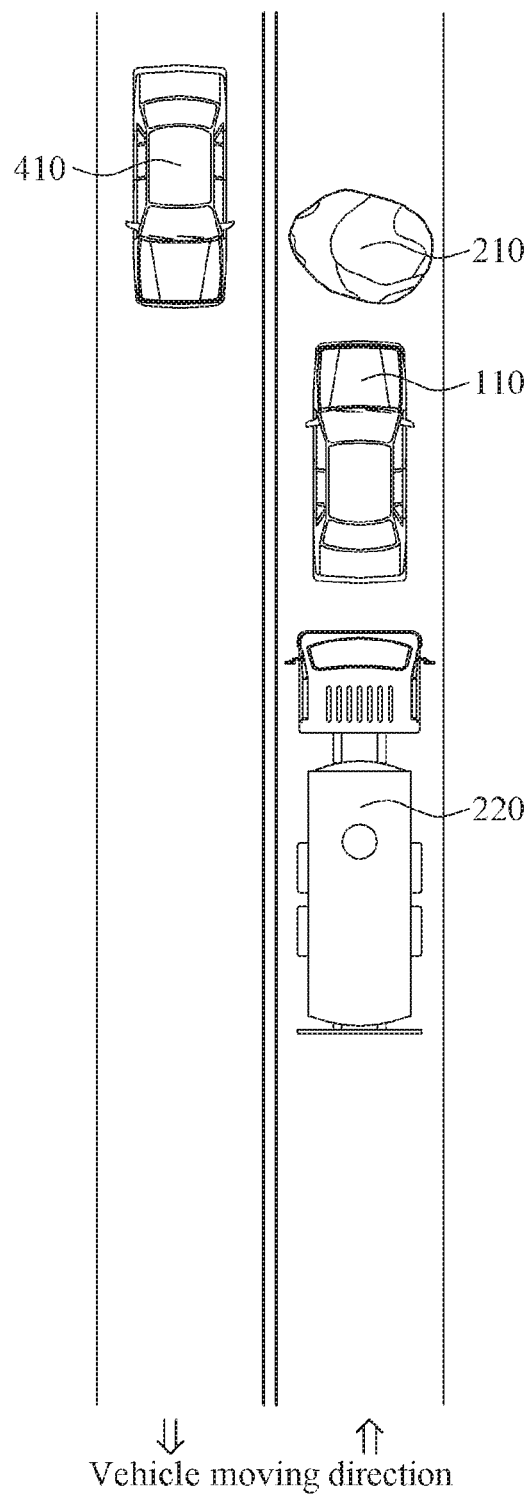
Figure 5:
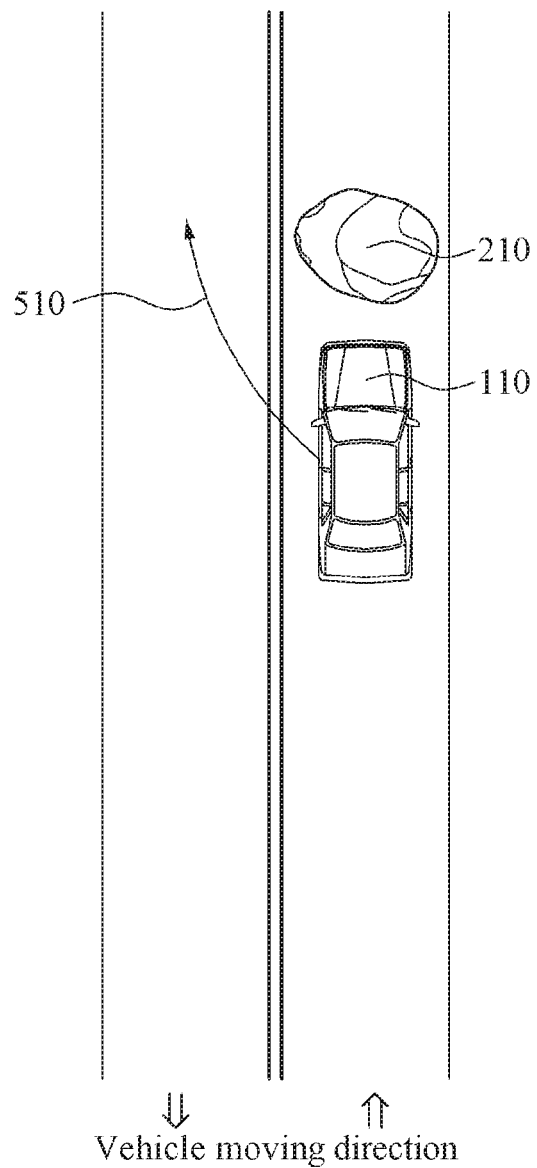

The vehicle 110 determines locations of the neighboring vehicles 220 and 230. The vehicle 110 may track movements of the neighboring vehicles 220 and 230 by periodically updating the locations of the neighboring vehicles 220 and 230. For example, referring to FIG. 3, in response to the neighboring vehicle 230 indicating a movement that avoids the obstacle 210 and crossing over a centerline, the movement of the neighboring vehicle 230 may be tracked. In another example, in response to the neighboring vehicle 220 not moving, the vehicle 110 may determine differences in surrounding circumstances by comparing a surrounding circumstance in which the neighboring vehicle 230 moves to a surrounding circumstance in which the neighboring vehicle 220 does not move. Referring to FIG. 4, a difference may indicate whether a vehicle 410 is present in an opposite driving lane. The vehicle 110 may track that the neighboring vehicle 220 stops. Referring to FIG. 5, the vehicle 110 may generate a temporary driving route 510 based on the movements of the neighboring vehicles 220 and 230. For example, the vehicle 110 stops in response to a vehicle being present in an opposite driving lane, and generates the temporary driving route 510 such that the vehicle 110 moves based on the movement of the neighboring vehicle 220 in response to the vehicle 410 being absent from the opposite driving lane. Further description of generating a temporary driving route is provided with reference to FIGS. 6 through 15.

Figure 6:
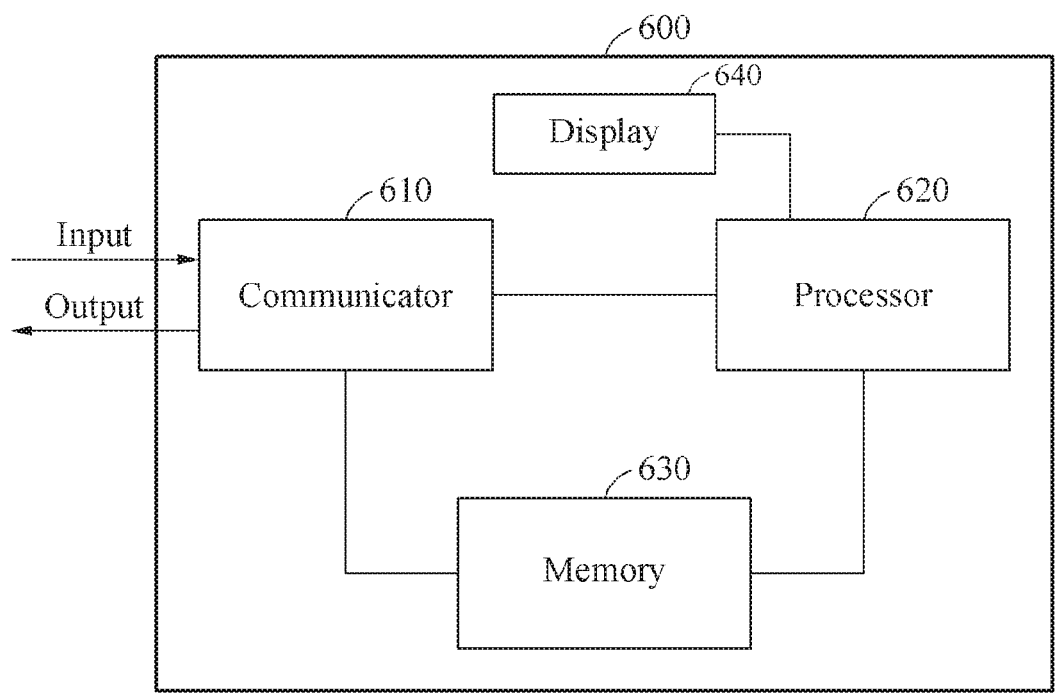
FIG. 6 is a diagram illustrating an example of an autonomous driving controller.

FIG. 6 is a diagram illustrating an example of an autonomous driving controller.

In an example, the vehicle 110 described with reference to FIGS. 1 through 5 includes an autonomous driving controller 600. The autonomous driving controller 600 generates driving route information of the vehicle 110 and controls mechanical elements of the vehicle 110 to follow a driving route. For example, the autonomous driving controller 600 may be provided in a system on chip (SOC), but the autonomous driving controller 600 is not limited thereto.

The autonomous driving controller 600 includes a communicator 610, a processor 620, a memory 630, and a display 640.

The communicator 610 is connected to the processor 620 and the memory 630. In an example, the communicator 610 is a circuitry in the autonomous driving controller 600. In an example, the communicator 610 includes an internal bus and an external bus. In another example, the communicator 610 is an element that connects the autonomous driving controller 600 and an external apparatus. The communicator 610 may be an interface. The communicator 610 may receive data from an external apparatus, and transmit the data to the processor 620 and the memory 630.

The processor 620 may process the data received by the communicator 610 and data stored in the memory 630. A "processor" may be a data processing apparatus that is implemented by one or more processing elements, such as, a microprocessor, a central processing unit, a processor core, a multi-core processor, a multiprocessor, an array of logic gates, a controller and an arithmetic logic unit, a digital signal processor, a microcomputer, a programmable logic controller, an application-specific integrated circuit (ASIC), and a field programmable gate array (FPGA), a programmable logic array, or any other device or combination of devices known to one of ordinary skill in the art that is capable of responding to and executing instructions in a defined manner to achieve a desired result. The processor may denote a type of a computational circuit, such as, for example, a microprocessor, a microcontroller, a complex instruction set computing (CISC) microprocessor, a reduced instruction set computing (RISC) microprocessor, a very long instruction word (VLIW) microprocessor, an explicitly parallel instruction computing (EPIC) microprocessor, a graphic processor, a digital signal processor, or a processing circuit of a different type.

The processor 620 may execute a code, for example, software, stored in a memory, for example, the memory 630, to be read by a computer and instructions caused by the processor 620.

The memory 630 stores the data received by the communicator 610 and the data processed by the processor 620. For example, the memory 630 may store a program.

In an example, as described below, the memory 630 may include at least one of a volatile memory or a non-volatile memory, a random access memory (RAM), a flash memory, a hard disk drive, or an optical disk drive.

The memory 630 stores an instruction set, for example, software, that generates a driving route and a temporary driving route. The instruction set that generates the driving route and the temporary driving route may be executed by the processor 620. The processor 620 generates the driving route and the temporary driving route based on the instruction set.

In an example, the driving route information generated by the autonomous driving controller 600 is also displayed on the display 640. The display 640 may be a physical structure that includes one or more hardware components that provide the ability to render a user interface and/or receive user input. The display 640 can encompass any combination of display region, gesture capture region, a touch sensitive display, and/or a configurable area. In an example, the display 640 is an external peripheral device that may be attached to and detached from the autonomous driving controller 600. The display 640 may be a single-screen or a multi-screen display. A single physical screen can include multiple displays that are managed as separate logical displays permitting different content to be displayed on separate displays although part of the same physical screen. The display 640 may also be implemented as an eye glass display (EGD), which includes one-eyed glass or two-eyed glasses.

Further description of the communicator 610, the processor 620, and the memory 630 will be provided with reference to FIGS. 7 through 12.

Figure 7:
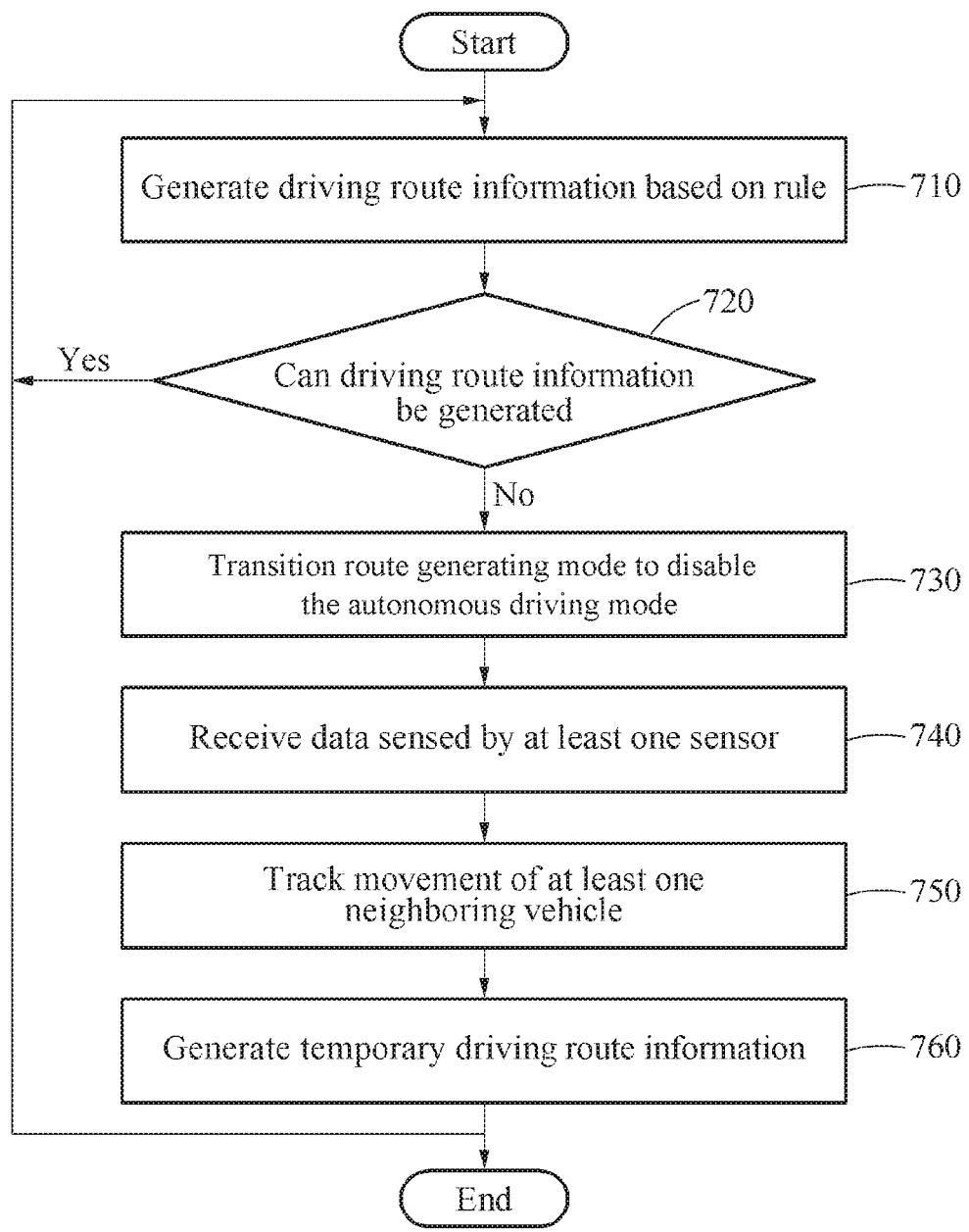
FIG. 7 is a diagram illustrating an example of a method of operating an autonomous driving controller.

FIG. 7 is a diagram illustrating an example of a method of operating an autonomous driving controller. The operations in FIG. 7 may be performed in the sequence and manner as shown, although the order of some operations may be changed or some of the operations omitted without departing from the spirit and scope of the illustrative examples described. Many of the operations shown in FIG.

7 may be performed in parallel or concurrently. In addition to the description of FIG. 7 below, the above descriptions of FIGS. 1-6, are also applicable to FIG. 7, and are incorporated herein by reference. Thus, the above description may not be repeated here.

In 710, the processor 620 generates driving route information based on a rule (or using a rule-based model). The rule-based model may be a model that generates a result to satisfy certain preset conditions. Further description of a method of generating the driving route information will be provided with reference to FIG. 8.

In 720, the processor 620 verifies whether the driving route information can possibly be generated based on the rule. For example, the processor 620 may ascertain that the driving route information cannot be generated based on the rule that a driving route is not generated for an preset amount of time.

In 730, the processor 620 transitions (or changes) a route generating mode from an autonomous driving mode to an autonomous driving disable mode. In an example, the autonomous driving disable mode is a mode that generates temporary driving route information.

In 740, the processor 620 receives data sensed by at least one sensor through the communicator 610. The at least one sensor may be attached to or installed in the vehicle 110, and may sense information on neighboring vehicles of the vehicle 110.

In 750, the processor 620 tracks a movement of at least one neighboring vehicle based on the data sensed by the sensor. Further description of tracking the movement the neighboring vehicle will be provided with reference to FIG. 9.

In 760, the processor 620 generates the temporary driving route information based on the movement of the neighboring vehicle. In an example, the vehicle, including the autonomous driving controller 600, is driven based on the temporary driving route. Further description of generating the temporary driving route will be provided with reference to FIG. 10.

The processor 620 may transition (or change) the route generating mode from the autonomous driving disable mode to the autonomous driving mode in response to the driving route being possible to generate based on the rule.

Although not illustrated in FIG. 7, after 760, the processor 620 may update log information on the conditions under which the driving route information is not generated. For example, the processor 620 may correlate the generated temporary driving route information with information on a surrounding environment recognized in response to the driving route information being impossible to generate, and may store the correlated information as the log information. The log information is further described with reference to FIG. 11. The log information may be information collected by the autonomous driving controller 600 or information transmitted based on a request/response method or downloaded through a server (not shown) connected to the autonomous driving controller 600 through wired or wireless communication.

Figure 8:
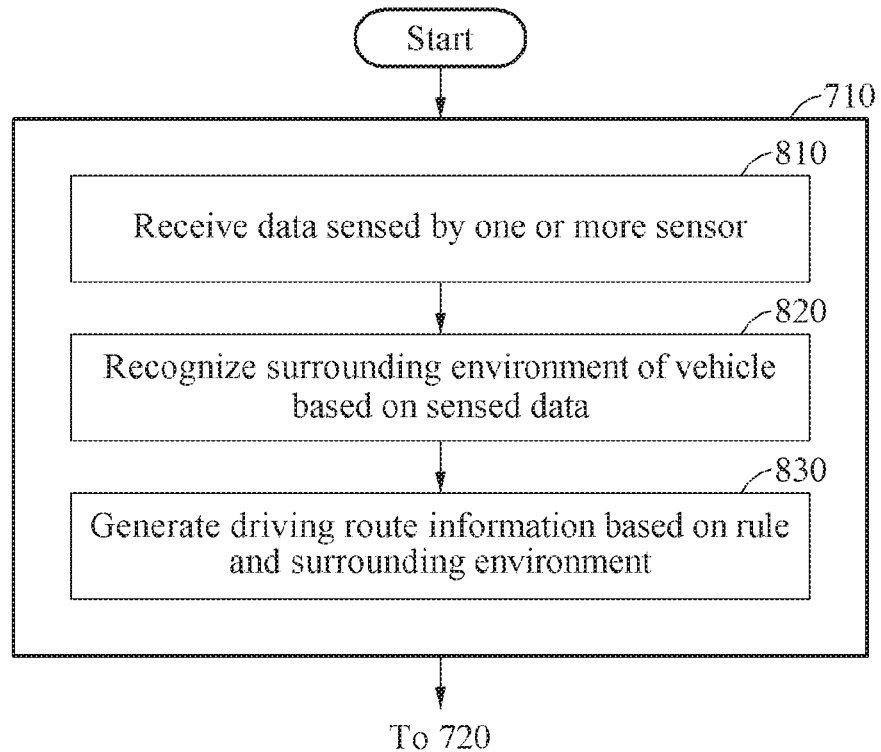
FIG. 8 is a diagram illustrating an example of a method of generating driving route information based on a rule.

FIG. 8 is a diagram illustrating an example of a method of generating driving route information based on a rule. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. In addition to the description of FIG. 8 below, the above descriptions of FIGS. 1-7, are also applicable to FIG. 8, and are incorporated herein by reference. Thus, the above description may not be repeated here.

In an example, operation 710 described with reference to FIG. 7 may include operations 810 through 830.

In 810, the processor 620 receives the data sensed by the sensor through the communicator 610. The sensor may sense a driving environment that surrounds the vehicle 110, and the sensed data may be information on the driving environment. The sensor may periodically sense an environment that surrounds the vehicle 110. Each of sensors may have respective operation frequencies.

In 820, the processor 620 recognizes a surrounding environment of the vehicle 110 based on the sensed data. For example, the processor 620 may recognize a location of the vehicle 110 on a road, a location relationship between the vehicle 110 and each of neighboring vehicles, a signal of a traffic light, and whether an obstacle is present, but the processor 620 is not limited thereto.

In 830, the processor 620 generates the driving route information based on the rule and the recognized surrounding environment.

Figure 9:
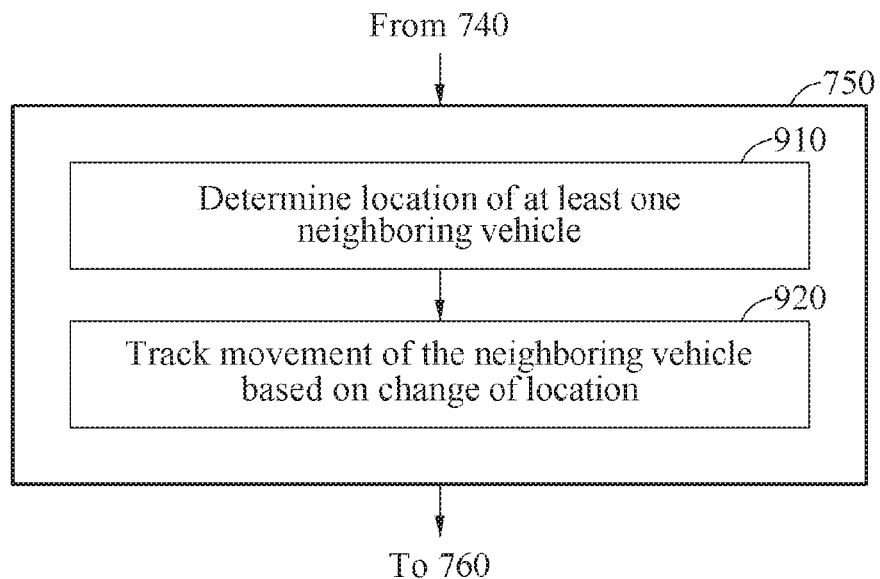
FIG. 9 is a diagram illustrating an example of a method of tracking movements of neighboring vehicles.

FIG. 9 is a diagram illustrating an example of tracking movements of neighboring vehicles. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. In addition to the description of FIG. 9 below, the above descriptions of FIGS. 1-8, are also applicable to FIG. 9, and are incorporated herein by reference. Thus, the above description may not be repeated here.

In an example, operation 750 described with reference to FIG. 7 includes 910 and 920.

In 910, the processor 620 periodically determines a location of at least one neighboring vehicle based on the periodically sensed data. For example, the processor 620 may detect at least one neighboring vehicle from an image (or frame) photographed by a camera, and periodically determine locations of vehicles detected using timely consecutive images. In another example, the processor 620 may detect at least one neighboring vehicle based on measuring reflected waves to measure variable distances to the neighboring vehicle.

In 920, the processor 620 tracks the movement of the at least one neighboring vehicle based on a change of the location of the at least one neighboring vehicle. The tracked movement of the at least one neighboring vehicle may indicate a driving route of the at least one neighboring vehicle.

Figure 10:
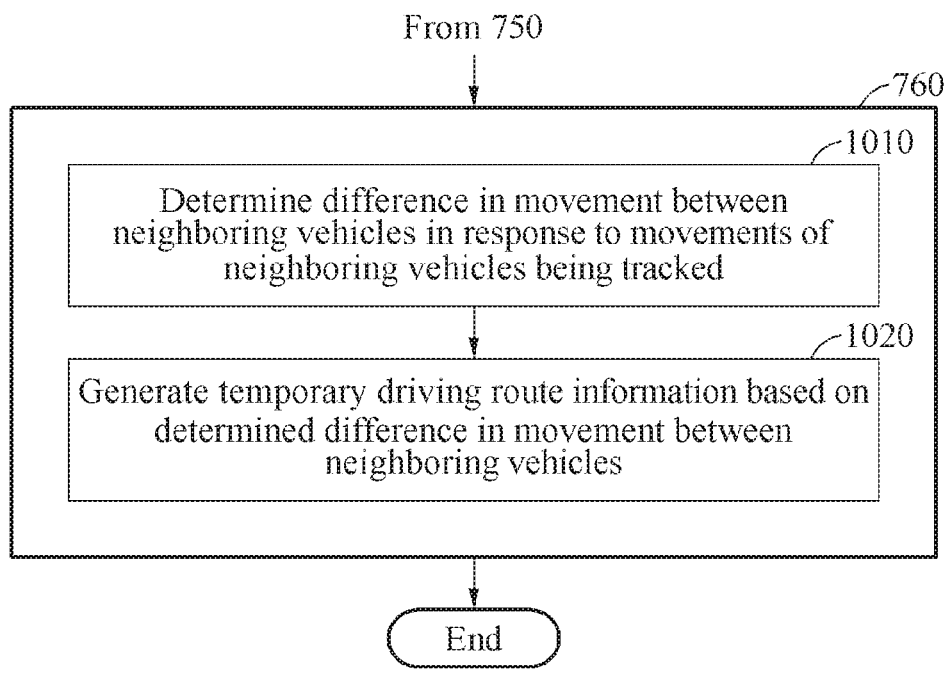
FIG. 10 is a diagram illustrating an example of a method of generating temporary driving route information.

FIG. 10 is a diagram illustrating an example of a method of generating temporary driving route information.

In an example, operations 760 described with reference to FIG. 7 may include operations 1010 and 1020. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. In addition to the description of FIG. 10 below, the above descriptions of FIGS. 1-9, are also applicable to FIG. 10, and are incorporated herein by reference. Thus, the above description may not be repeated here.

In 1010, the processor 620 determines a difference in movement between neighboring vehicles in response to the movements of the neighboring vehicles being tracked. In an example, the processor 620 determines the difference in movement between the neighboring vehicles by comparing a first surrounding environment in which a first vehicle of the neighboring vehicles moves to a second surrounding environment in which a second vehicle of the neighboring vehicles does not move. For example, comparing a difference between an instance in which a vehicle is absent from an opposite driving lane when the first vehicle moves and an instance in which the vehicle is present in the opposite driving lane and moves in the opposite direction when the second vehicle does not move may indicate whether the vehicle is present in the opposite driving lane.

In 1020, the processor 620 generates the temporary driving route information based on the determined difference in movement between the neighboring vehicles. The processor 620 may generate the temporary driving route information in response to a current surrounding environment being determined to be the first surrounding environment including the difference. For example, the processor 620 may generate the temporary driving route information in response to the current surrounding information being determined to be an environment in which a vehicle is absent from the opposite driving lane. The processor 620 may generate the temporary driving route information in response to an absence of a vehicle moving in a direction different from a driving direction of the vehicle 110. The processor 620 may generate the temporary driving route information to follow the change of the movement of the at least one neighboring vehicle. For example, the processor 620 may generate the temporary driving route information to follow a driving route of the first vehicle.

Figure 11:
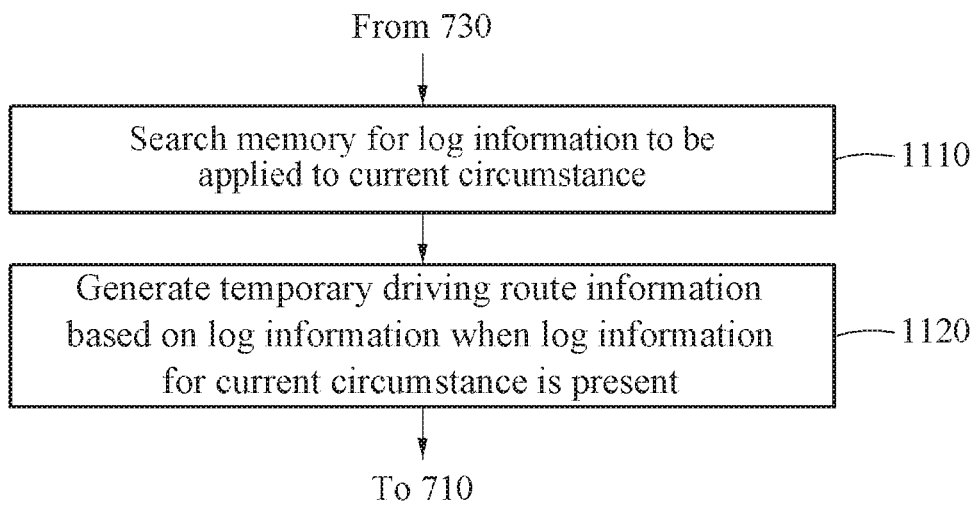
FIG. 11 is a diagram illustrating an example of a method of generating temporary driving route information based on information to be applied to a current circumstance.

FIG. 11 is a diagram illustrating an example of a method of generating temporary driving route information based on information to be applied to a current circumstance. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. In addition to the description of FIG. 11 below, the above descriptions of FIGS. 1-10, are also applicable to FIG. 11, and are incorporated herein by reference. Thus, the above description may not be repeated here.

In an example, operations 1110 and 1120 may be performed after operation 730 described with reference to FIG. 7 is performed.

In 1110, the processor 620 searches the memory 630 for log information to be applied to a current circumstance in response to the route generating mode being transitioned to the autonomous driving disable mode. The processor 620 may determine the current circumstance by recognizing the surrounding environment of the vehicle 110. The current circumstance may include a type of an obstacle, a size of the obstacle, a size of a lane, a number of lanes, weather conditions, road conditions, and type of road. The current circumstance is not limited thereto, and other current circumstance are considered to be well within the scope of the present disclosure. For example, the processor 620 may search the memory 630 for the log information of which a similarity with the current circumstance is greatest. In response to a calculated similarity being less than or equal to a preset threshold, operation 740 may be performed.

In 1120, the processor 620 generates the temporary driving route information based on the log information when the log information to be applied to the current circumstance is present. For example, the temporary driving route information may be temporary driving route information associated with the log information.

Figure 12:
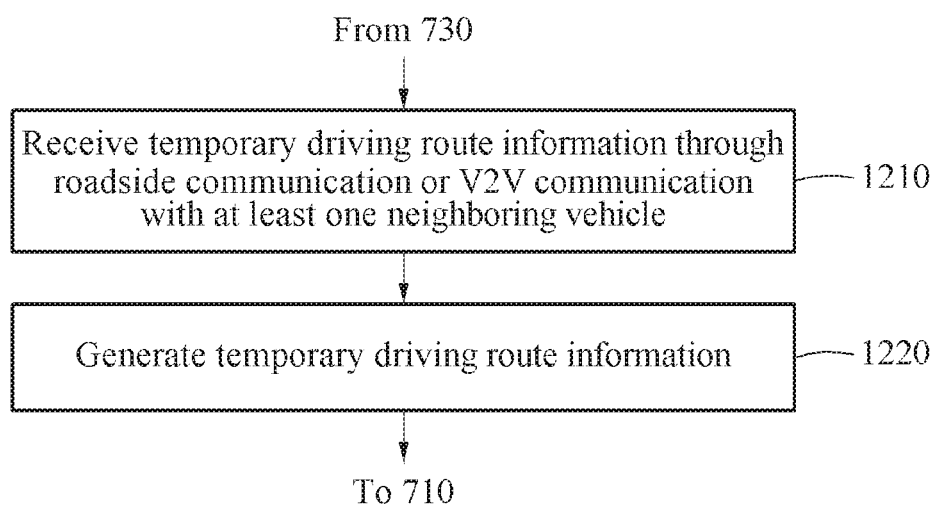
FIG. 12 is a diagram illustrating an example of a method of receiving temporary driving route information through vehicle to vehicle (V2V) communication or roadside communication.

FIG. 12 is a diagram illustrating an example of a method of receiving temporary driving route information through vehicle to vehicle (V2V) communication or roadside communication. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. In addition to the description of FIG. 10 below, the above descriptions of FIGS. 1-9, are also applicable to FIG. 10, and are incorporated herein by reference. Thus, the above description may not be repeated here.

Operations 1210 and 1220 may be performed after operation 730 described with reference to FIG. 7 is performed.

In 1210, the communicator 610 receives the temporary driving route information through the vehicle to vehicle (V2V) communication, wireless communication, or the roadside communication with at least one neighboring vehicle. For example, the roadside communication may be communication with a roadside apparatus installed to provide traffic information.

In 1220, the processor 620 generates temporary driving route information of the vehicle 110 based on the received temporary driving route information.

Figure 13:
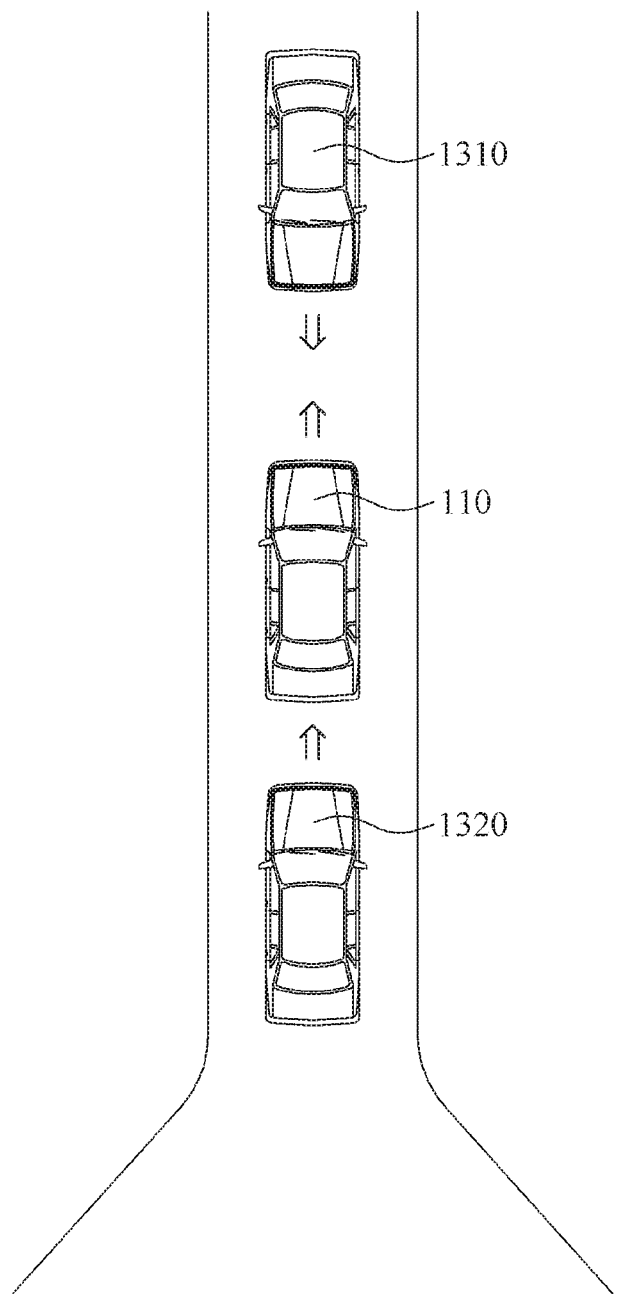
FIGS. 13 through 15 each illustrate examples of a method of generating temporary driving route information.
Figure 14:
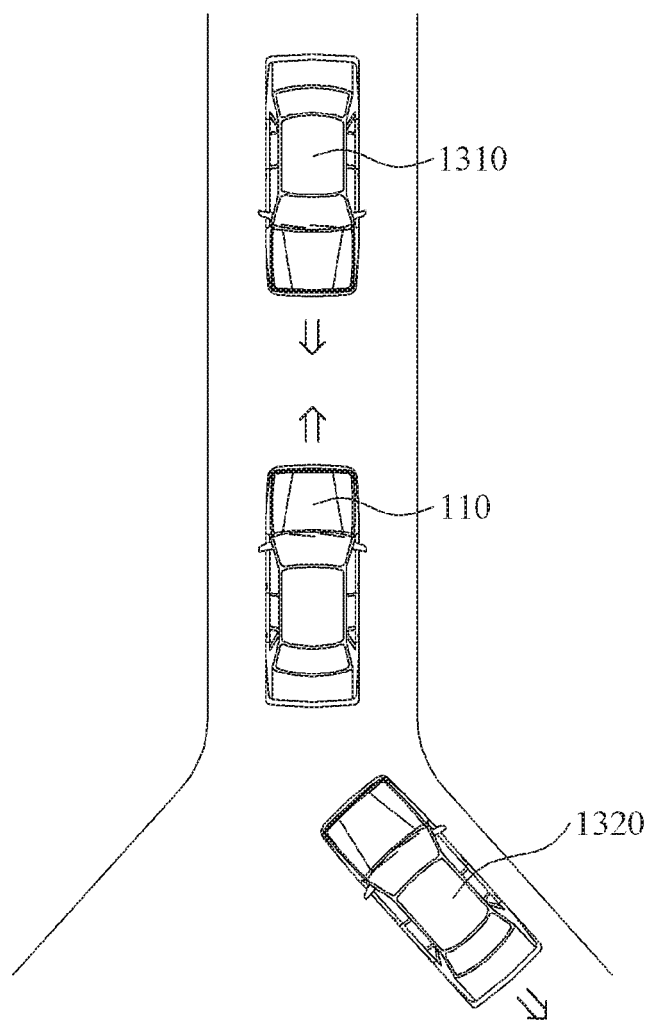
Figure 15:
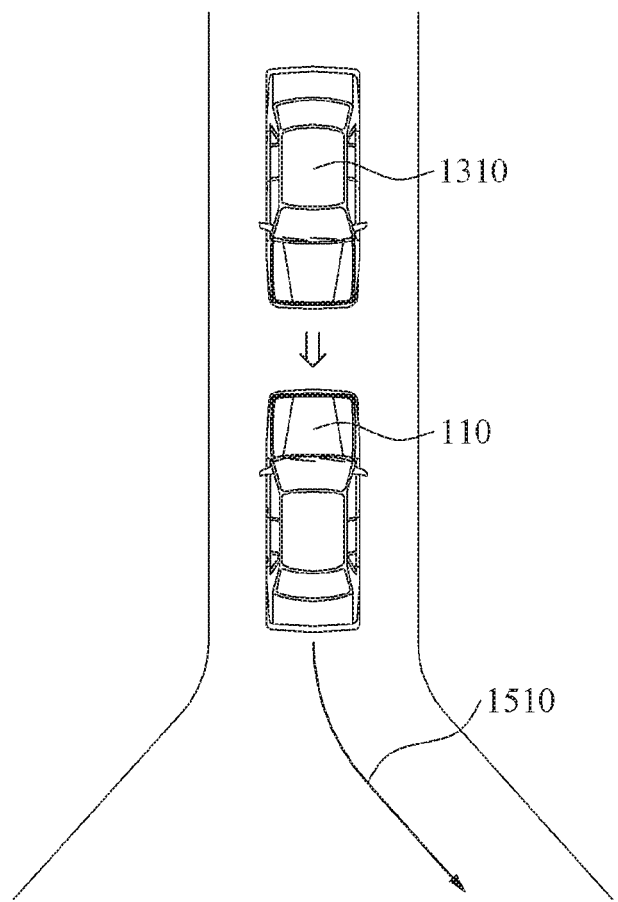

FIGS. 13 through 15 illustrate an example of generating temporary driving route information.

When there is only one driving lane, vehicles driving in different directions may bump into each other. For example, the vehicle 110 including the autonomous driving controller 600 and a vehicle 1310 may bump into each other. In this example, when the vehicle 1310 is not clear of the driving lane, the autonomous driving controller 600 may be unable to generate a driving route in an autonomous driving mode.

The autonomous driving controller 600 may transition a route generating mode from the autonomous driving mode to an autonomous driving disable mode, and periodically determine a location of a neighboring vehicle 1320 using at least one sensor.

For example, the neighboring vehicle 1320 may reverse to handle the current circumstance. The autonomous driving controller 600 may track a movement of the neighboring vehicle 1320 by determining a change in the location of the neighboring vehicle 1320.

As shown in FIG. 15, the autonomous driving controller 600 may generate temporary driving route information 1510 of the vehicle 110 based on the tracked movement.

FIG. 16 is a diagram illustrating an example of a method of generating temporary driving route information. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. In addition to the description of FIG. 16 below, the above descriptions of FIGS. 1-15, are also applicable to FIG. 16, and are incorporated herein by reference. Thus, the above description may not be repeated here.

The descriptions of operations 1610, 1620, and 1630 correspond to the descriptions of operations 710, 720, and 730, respectively, of FIG. 7, and are incorporated herein by reference. Thus, the above description may not be repeated here.

In 1640, the processor 620 searches the memory 630 for log information having a greatest similarity with a current circumstance. For example, the current circumstance may include a type of an obstacle, a size of the obstacle, a size of a driving lane, and a number of driving lanes, but the current circumstance is not limited thereto.

In 1650, the processor 620 verifies whether the retrieved log information is applicable to the current circumstance. In an example, the processor 620 may verify that the log information is not applicable to the current circumstance when the calculated similarity of the log information stored in the memory 630 being greater than or equal to a preset threshold. In another example, the processor 620 may verify that the log information is not applicable to the current circumstance when the log information fails to satisfy a preset condition. The preset essential condition may be a condition associated with safety of a vehicle driver or driving regulations.

Operation 740 described with reference to FIG. 7 may be performed based on a verification that the retrieved log information is not applicable to the current circumstance. In an example, when the retrieved log information is not applicable to the current circumstance, the processor 620 may consider a method of generating temporary driving route information by tracking movements of neighboring vehicles.

In 1660, the processor 620 generates the temporary driving route information based on the retrieved log information.

The autonomous driving controller 600, communicator 610, apparatuses, units, modules, devices, and other components described herein are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7-12 and 16 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), electrically erasable programmable read-only memory (EEPROM), random-access memory (RAM), dynamic random access memory (DRAM), static random access memory (SDRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of driving a vehicle, the method comprising:
generating driving route information for the vehicle based on a rule; and
in response to the driving route information not being generated based on the rule for an amount of time greater than or equal to a threshold:
disabling an autonomous driving mode using the driving route information;
tracking at least one neighboring vehicle based on data sensed by a sensor;
generating temporary driving route information based on a movement of the at least one neighboring vehicle; and
driving the vehicle based on the temporary driving route information.

2. The method of claim 1, wherein the generating of the driving route information comprises:
recognizing a surrounding environment of the vehicle based on the data sensed by the sensor; and
generating the driving route information based on the recognized surrounding environment and the rule.

3. The method of claim 1, wherein the tracking of the movement of the at least one neighboring vehicle comprises:
periodically determining a location of the at least one neighboring vehicle; and
tracking the movement of the at least one neighboring vehicle based on a change of the location of the at least one neighboring vehicle.

4. The method of claim 1, wherein the generating of the temporary driving route information comprises:
determining a difference in movement between a first neighboring vehicle and a second neighboring vehicle, in response to movements of two neighboring vehicles being tracked; and
generating the temporary driving route information based on the difference in movement between the first neighboring vehicle and the second neighboring vehicle.

5. The method of claim 4, wherein the determining of the difference comprises determining the difference by comparing a first surrounding environment in which the first neighboring vehicle moves to a second surrounding environment in which the second neighboring vehicle does not move, and
the generating of the temporary driving route information comprises generating the temporary driving route information based on the first surrounding environment including the difference.

6. The method of claim 1, wherein the generating of the temporary driving route information comprises generating the temporary driving route information to move the vehicle based on a change of a location of the at least one neighboring vehicle.

7. The method of claim 1, wherein the at least one neighboring vehicle comprises a vehicle moving in a direction identical to a direction of the vehicle.

8. The method of claim 1, wherein the at least one sensor comprises any one or any combination of a camera, a lidar, and a radar.

9. The method of claim 1, wherein the generating of the temporary driving route information comprises generating the temporary driving route information in response to an absence of a movement of a vehicle in a direction different from a direction of the vehicle.

10. The method of claim 1, further comprising, in response to the driving route information not being generated based on the rule for the amount of time greater than or equal to the threshold, updating log information stored in a memory.

11. The method of claim 10, further comprising:
searching the memory for the log information corresponding to a current circumstance, in response to a route generating mode being transitioned to an autonomous driving disable mode; and
generating the temporary driving route information based on the log information corresponding to the current circumstance.

12. The method of claim 11, wherein the current circumstance comprises any one or any combination of a type of an obstacle, a size of the obstacle, weather conditions, type of a road, road conditions, a size of a lane, and a number of lanes, and
the searching comprises searching the memory for the log information having greatest similarity with the current circumstance.

13. The method of claim 1, further comprising:
receiving the temporary driving route information through wireless communication or vehicle to vehicle (V2V) communication with the at least one neighboring vehicle, in
response to a route generating mode being transitioned to an autonomous driving disable mode.

14. A non-transitory computer-readable medium storing instructions that, when executed by a processor, causes the processor to perform the method of claim 1.

15. An autonomous driving controller comprising:
a memory configured to store instructions; and
a processor configured to execute the instructions to generate route information for a vehicle based on a rule, and in response to the driving route information not being generated based on the rule for an amount of time greater than or equal to a threshold, configured to transition from an autonomous driving mode to an autonomous driving disable mode, track at least one neighboring vehicle based on data sensed by a sensor, generate temporary driving route information based on a movement of the at least one neighboring vehicle and control the vehicle based on the temporary driving route information.

16. A method of controlling autonomous driving controller, the method comprising:
generating route information for a vehicle based on a rule;
in response to the driving route information not being generated based on the rule for an amount of time greater than or equal to a preset time:
transitioning from an autonomous driving mode to an autonomous driving disable mode;
searching a memory for log information having greatest similarity with a current circumstance, in response to the transitioning to the autonomous driving disable mode;
generating temporary driving route information based on the log information; and
controlling the vehicle based on the temporary driving route information.

17. A method of driving a vehicle, the method comprising:
generating route information for the vehicle being driven in an autonomous driving mode; and
in response to the route information violating a rule for a time period greater than a threshold:
disabling the autonomous driving mode;
tracking a change of a location of at least one neighboring vehicle based on data sensed by a sensor;

generating temporary driving route information based on the change of the location of the at least one neighboring vehicle; and driving the vehicle based on the temporary driving route information.

18. The method of claim 17, wherein the generating of the temporary driving route information comprises generating a temporary driving route based on the change of the location of the at least one neighboring vehicle and a surrounding environment in which the at least one neighboring vehicle moves.

19. The method of claim 17, further comprising:
updating log data, in a memory, in response to the generating of the temporary driving route information.

20. The method of claim 19, wherein the generating of the temporary driving route information comprises generating a temporary driving route based on the change of the location of the at least one neighboring vehicle and log entry, stored in the memory, corresponding to a surrounding environment of the vehicle.

* * * * *